Aug. 20, 1957 M. G. KROGER 2,803,700
SIGNAL LEVEL CONTROL OF NOISE CANCELLATION TUBE CONDUCTION THRESHOLD
Filed March 1, 1952
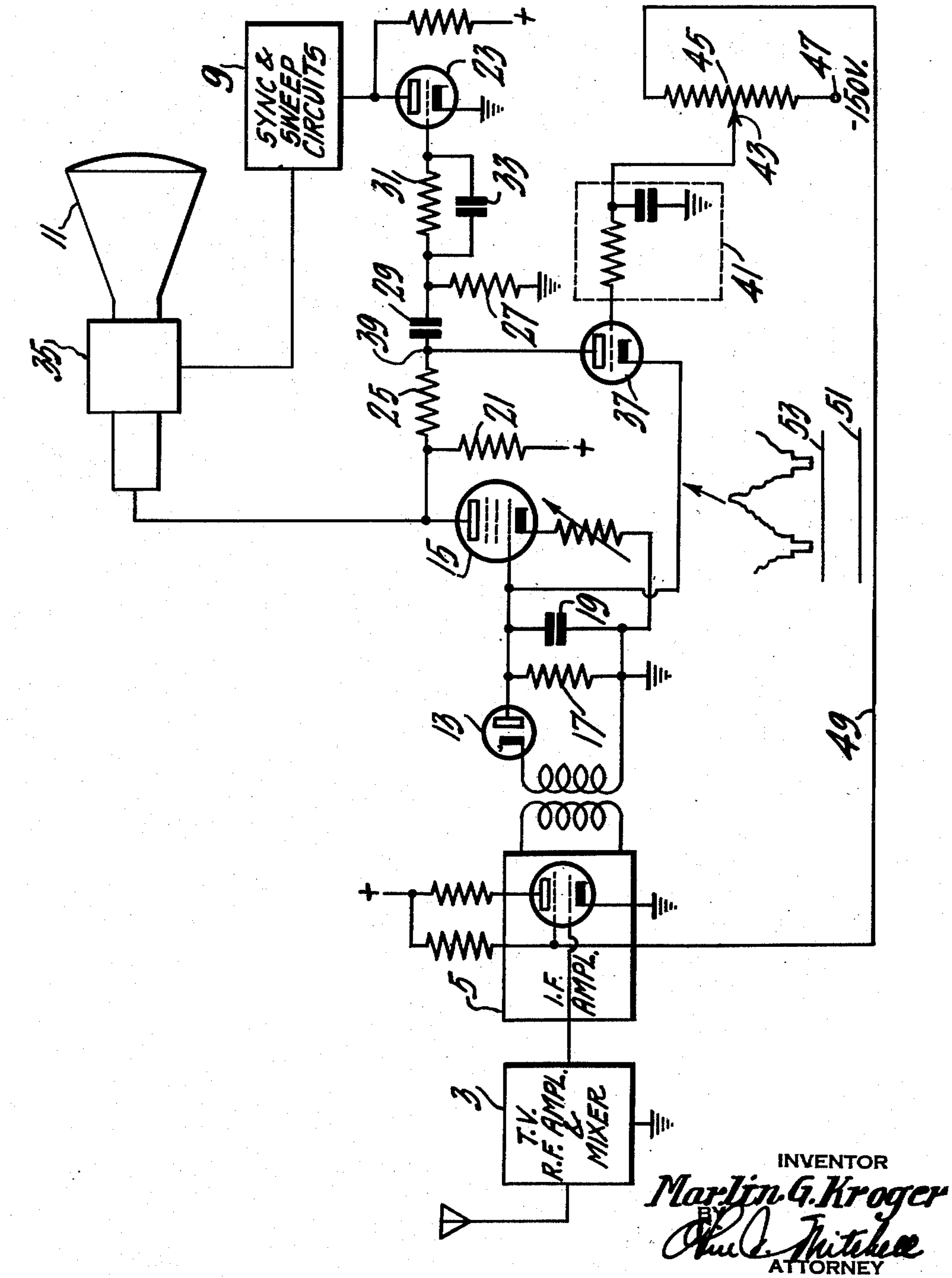
INVENTOR
Marlin G. Kroger
BY
Paul A. Mitchell
ATTORNEY

United States Patent Office 2,803,700
Patented Aug. 20, 1957

2,803,700

SIGNAL LEVEL CONTROL OF NOISE CANCELLATION TUBE CONDUCTION THRESHOLD

Marlin G. Kroger, Princeton, N. J., assignor to Radio Corporation of America, a corporation of Delaware Application March 1, 1952, Serial No. 274,326
2 Claims. (Cl. 178—7.3)

This invention relates to electrical circuits and particularly to electrical circuits designed to permit the passage only of those applied signals having amplitudes falling below a pre-determined level without adversely affecting the wave forms of the signals so passed.

In one of its aspects the present invention relates to noise immunity in the synchronizing and automatic gain control (AGC) circuits of television receivers.

A copending U. S. patent application of Jack Avins, Serial Number 226,712, filed May 16, 1951, discloses a circuit in which improved noise immunity is obtained by providing a noise inverter tube between the input and the output of a video amplifier. This noise inverter is biased to conduct when a noise pulse, whose amplitude extends beyond the level of the tips of the synchronizing pulses, is present at the input of the noise inverter thus producing an inverted noise pulse which reverses the polarity of the noise pulse which would otherwise be present at the output of the video amplifier.

Some of the design considerations attendant to this noise inverter type of circuit are the following: it is desirable to bias the noise inverter tube so that it will start to conduct just beyond sync peak height. This is so because if the level at which the noise inverter tube starts to conduct is kept way beyond the sync tips, there will be no cancellation of noise lying between the sync tips and that level. It is also highly desirable to make sure that under no conditions the noise inverter tube will conduct the sync pulses. This is so because, should the noise inverter tube conduct sync pulses cancellation of sync would take place and the receiver would be in a "locked-out" condition.

It is an object of this invention to improve the immunity to noise of televsion receivers.

It is another object of this invention to prevent a noise inverter type of circuit from inverting synchronizing pulses.

It is another object of this invention to provide, in a television receiver, means to bias off a noise inverter when the receiver is overloaded.

According to the present invention, the bias on the noise inverter tube comprises two component voltages. One component is a voltage of such magnitude and polarity that the noise inverter will conduct only in the presence of substantial noise. That is to say, this first component is such that, when applied alone to the noise inverter tube, the level at which the noise inverter tube will start to conduct is kept way beyond the sync tips. A second component voltage brings the total bias on the noise inverter tube at the desired level, which is just beyond sync peak height. This second component is connected to a point, in the receiver, whose potential falls when the receiver is overloaded. Thus, when the receiver is operating normally, the total bias on the noise inverter tube is kept just beyond sync peak height. And when the receiver is overloaded, the total bias on the noise inverter tube is kept way beyond the sync tips, thus preventing sync cancellation.

Other and incidental objects of the invention will be apparent to those skilled in the art from a reading of the following specification and an inspection of the accompanying drawing which shows by circuit diagram a television receiver employing an embodiment of the invention.

Referring to the drawing there is shown a television receiver which includes an R. F. amplifier and mixer section 3, and I. F. amplifier section 5. Details relating to these sections as well as to the synchronizing and sweep circuits 9 and the kinescope 11 have not been shown as they are well known to those skilled in the art.

The output signal of the video detector tube 13 is fed to the control grid of a video amplifier tube 15. Resistor 17 and capacitor 19 are associated with the video detector tube 13. The anode of amplifier tube 15 is connected to a source of positive potential through resistor 21, and to a synchronizing signal separator tube 23 through a resistor 25, a slow time constant circuit comprising resistor 27 and capacitor 29, and a fast time constant circuit comprising resistor 31 and capacitor 33. The anode of amplifier tube 15 is also connected to an electrode of kinescope 11. The output of the synchronizing signal separator tube 23 is connected to the sync and sweep circuits 9, which are connected to the deflection yoke 35 of kinescope 11.

The cathode of a noise inverter tube 37 is connected to the output of the video detector 13. The anode of the noise inverter tube 37 is connected to point 39, point 39 being the end of resistor 25 remote from the anode of video amplifier 15.

The control electrode of the noise inverter tube 37 is connected through filter 41 to a point 43 on potentiometer 45. One end of potentiometer 45 is connected to a source of negative potential 47 while its other end is connected through lead 49 to a point whose potential falls when the receiver is overloaded. Such a point may be the screen grid or the plate of one of the latter I. F. amplifier stages.

The operation of the circuit is as follows: A negative biasing potential is applied to the control electrode of the noise inverter tube 37 so that it conducts only when noise pulses extending beyond synchronizing pulse height are present at the video detector circuit. When the noise inverter tube 37 conducts, it produces across resistor 25 a negative pulse which is in opposite phase to the positive noise pulse that will have reached this point through the video amplifier tube 15, and substantial cancellation will take place. This action does not require a critical balance between the two pulses: the negative noise pulse developed by the noise inverter tube 37 at its anode will generally exceed the positive noise pulse produced at the same point by the video amplifier. This will momentarily drive the grid of the sync separator tube 23 more negative than is necessary to obtain noise immunity. "White" noise pulses will generally be introduced by the noise inverter tube 37 at its anode, but these "white" pulses will be attenuated sufficiently when they reach the anode of the video amplifier tube 15 so that "white" noise in the picture will not be observed when the noise inverter tube 37 conducts on noise peaks. The amount of attenuation provided increases as the ratio $R25/R21$ increases. This factor, together with the desirability of providing a high load resistance for the noise inverter tube 37, shows that resistor 25 should be as large as is consistent with acceptable sync compression at the grid of the sync separator.

In accordance with the present invention, the bias on the noise inverter tube comprises two component voltages. One component derived from point 47 is a voltage of such magnitude and polarity that the noise inverter will conduct only in the presence of substantial noise. That is to say, this first component is such that, when applied along to the noise inverter tube, the level 51 at which the noise inverter tube will start to conduct is kept way beyond the sync tips. A second component voltage brings the total bias on the noise inverter tube at the desired level 53, which is just beyond sync peak height. This second component is connected to a point, in the receiver, whose potential falls when the receiver is overloaded. Such a point is shown as the screen grid of one of the I. F. stages. For best results, this I. F. stage should not be controlled by the AGC potential. Thus, when the receiver is operating normally, the total bias on the noise inverter tube is kept just beyond sync peak height. And when the receiver is overloaded, the total bias on the noise inverter tube is kept way beyond the sync tips, thus preventing sync cancellation.

What is claimed is:

1. In a television receiving system for receiving a broadcast amplitude modulated television radio carrier having a periodically recurrent synchronizing pulse component defined by peak excursions of said modulated carrier, said carrier being subject to noise contamination which results in unwanted received signal excursions exceeding those carrier excursions representing said synchronizing pulse component, the combination of: a substantially fixed gain amplifier means connected to amplify electrical signal representations of said modulated radio carrier, said amplifier means including means imparting to the signal transfer characteristic of said amplifier a substantially linear portion over a first range of applied signal excursions having amplitudes below a predetermined value and a nonlinear portion for a second range of applied signal excursions having amplitudes above said predetermined value such that the amplitude of said synchronizing pulse component tends to become reduced by signal compression in said amplifier for received signals having amplitudes extending into said nonlinear portion of said transfer characteristic; a noise cancellation circuit of the suicide type operatively coupled with the output of said amplifier means, said noise cancellation circuit having direct current voltage responsive means for controlling the signal cancellation threshold of said cancellation circuit, said threshold being nominally adjusted to provide cancellation of signal excursions exceeding the peaks of said synchronizing pulse component in received signals having an amplitude not exceeding said predetermined value, whereby to desirably cancel said unwanted noise contamination signal excursions but otherwise tending to undesirably reduce by signal cancellation the amplitude of said synchronizing pulse components in received signals having amplitudes exceeding said predetermined value; means operatively included in said amplifier means for developing a direct current control potential the value of which is substantially constant except when said amplifier means is driven into its nonlinear portion of said signal transfer characteristic; and means operatively applying said control potential to said threshold circuit in an electrical sense which increases its operating threshold to an extent preventing cancellation of synchronizing pulse components during the reception of signals having amplitudes driving said amplifier means into said nonlinear portion of said transfer characteristic, whereby the amplitude of said synchronizing pulse component is reduced substantially only by an amount imposed by the nonlinear transfer characteristic of said amplifier means.

2. In a television receiving system for receiving a broadcast amplitude modulated television radio carrier having a periodically recurrent synchronizing pulse component defined by peak excursions of said carrier, said carrier being subject to noise contamination which results in unwanted signal excursions which exceed those carrier excursions defining said synchronizing pulse component, the combination of: superheterodyne signal conversion means operatively connected in said receiver to develop an intermediate frequency version of received television radio carriers; an intermediate frequency amplifier means operatively coupled with the output of said conversion means, said amplifying means including an electron tube having at least an anode, cathode, control electrode and screen electrode; output load means including a source of anode polarizing potential connected between said anode and cathode; input circuit means connected between said control electrode and cathode; bias means connected with said input circuit means for establishing a substantially fixed bias between said control electrode and cathode whereby said electron tube provides a substantially fixed signal gain; circuit means operatively connected between said screen electrode and cathode for applying a polarizing potential to said screen electrode; a resistor connected in said screen electrode polarizing circuit means so that screen electrode current passes through said resistor to develop across said resistor a potential having a value determined by the current drawn by said screen electrode; signal demodulator means connected with said electron tube output circuit for developing a demodulated video signal; a synchronizing pulse separating circuit; a noise cancelling circuit of the suicide variety connected between said demodulator and said synchronizing signal separator circuit, said noise cancelling circuit having direct current voltage responsive means for controlling the signal cancellation threshold of said cancellation circuit, said threshold being nominally adjusted to provide desirable cancellation of signal excursions exceeding said synchronizing pulse component for received television carrier amplitudes not exceeding a predetermined value whereby to cancel said unwanted noise contamination signal excursions, but otherwise tending to undesirably reduce by signal cancellation the amplitude of said synchronizing pulse component for received signal amplitudes exceeding said predetermined value; means included in said amplifier means imparting to said amplifier a signal transfer characteristic which has a substantially linear portion for signal excursions having amplitudes below said predetermined value and a nonlinear portion for signal excursions having an amplitude above said predetermined value such that the amplitude of said synchronizing pulse component tends to become reduced by signal compression in said electron tube for received signals having an amplitude in excess of said predetermined value and such that the current to said screen electrode is substantially constant except in response to operation over said nonlinear portion of said amplifier signal transfer characteristic; and means direct current connecting the potential developed across said resistor to said cancellation circuit in an electrical sense which increases the operating threshold of said cancellation circuit only upon nonlinear operation of said amplifier and to an extent substantially preventing cancellation of synchronizing pulse components delivered by said demodulator upon the receipt of signals having an amplitude driving said amplifier means into said condition of nonlinear operation.

References Cited in the file of this patent

UNITED STATES PATENTS

| | | |
|---|---|---|
| 2,105,538 | Landon | Jan. 18, 1938 |
| 2,151,774 | Koch | Mar. 28, 1939 |
| 2,151,778 | Landon | Mar. 28, 1939 |
| 2,250,132 | Parr | July 22, 1941 |
| 2,250,144 | Welty | July 22, 1941 |
| 2,265,883 | Applegarth | Dec. 9, 1941 |
| 2,301,522 | Cawein | Nov. 10, 1942 |
| 2,455,450 | Thompson | Dec. 7, 1948 |
| 2,490,025 | Bryan | Dec. 6, 1949 |
| 2,631,230 | Marsh | Mar. 10, 1953 |
| 2,718,552 | Anderson | Sept. 20, 1955 |

FOREIGN PATENTS

| | | |
|---|---|---|
| 631,377 | Great Britain | Nov. 2, 1949 |

OTHER REFERENCES

Rider's Television Manual, vol. 2, Admiral TV, pages 2–37, 38, 39, Philco TV, pages 2–33, 34, 35.